United States Patent Office 3,288,754
Patented Nov. 29, 1966

3,288,754
SILICON MODIFIED POLYAMIDE-POLYIMIDE POLYMERS
Donald E. Green, Midland, Mich., assignor to Dow Corning Corporation, Midland, Mich., a corporation of Michigan
No Drawing. Filed Dec. 12, 1963, Ser. No. 329,995
14 Claims. (Cl. 260—47)

The present invention relates to new and improved polyamide-polyimide polymers. More specifically, the present invention relates to polyamide-polyimide polymers modified with silicon-containing materials.

Polyimide containing polymers have some short comings which inhibit their maximum utility in many applications in which their mechanical, electrical and thermal properties would be of significant value, if the undesirable characteristics were eliminated. One such undesirable characteristic is the poor wettability of surfaces, particularly metal surfaces. If metals were more easily wet, the polyimide polymers could be used in many additional applications in which the wetting characteristic has either prevented its use or complicated the application making its use commercially unfeasible. Polyimides used as wire coatings have excellent electrical properties, but the application of several coats is needed to give the desired thickness, making the utility of polyimides as wire coatings impractical.

Adhesion to surfaces is not as good as desired, especially for glass surfaces. The low adhesion prevents the polyimides mechanical properties from functioning at the maximum level.

The organic solvent systems required for solution applications are exceptionally expensive, particularly because the solids concentration is very low, such as 10 to 20 weight percent. Higher solids concentrations are too difficult to use in fabrications because such solutions are viscous, gummy and difficult to handle. The lower solids concentrations require large proportions of expensive organic solvents, consequently, costs are high as the solvents are wasted and several applications are required to obtain the needed thickness.

It is an object of the present invention to provide a silicon-containing modified polyamide-polyimide polymer which has improved wetting characteristics.

Another object is to provide a silicon-containing modified polyamide-polyimide polymer which requires less solvent for workable systems and less expensive solvents.

Another object is to provide a silicon-containing modified polyamide-polyimide polymer which has improved adhesion on glass.

Another object is to provide a thermally stable polymer with excellent electrical and mechanical properties.

Other objectives are detailed in or will be apparent from the detailed description of the present invention.

The present invention relates to a new and improved composition of matter consisting essentially of a reaction product prepared by reacting (I) 45 to 99 inclusive weight percent, based on the total weight of (I) and (II) of an organic solvent soluble polyamide-polyimide prepolymer formed by reacting (A) from 45 to 55 inclusive mol percent of at least one carbocyclic aromatic compound selected from the group consisting of aromatic acids, aromatic esters and aromatic anhydrides, having at least three carbonyl-containing groups per molecule selected from the group consisting of carboxyl groups, —COOH; ester groups, —COOR' in which R' is a monovalent hydrocarbon radical; and anhydride groups,

bonded only to another

through $O_{1/2}$, and at least two of the carbonyl-containing groups are in ortho positions, with (B) from 45 to 55 inclusive mol percent of diamines selected from the group consisting of organic aliphatic diamines, organic aromatic diamines and organic mixed aliphatic-aromatic diamines, each diamine contains at least one primary amine group with (II) from 1 to 55 inclusive weight percent, based on the total weight of (I) and (II), of a functional organosilyl component free of silicon-halogen bonds of the general formula

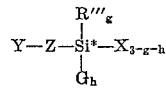

in which Y is a functional group free of silicon atoms selected from the group consisting of carboxyl, hydroxyl, aldehyde, amide, primary amine, secondary amine, anhydride, carbamate, 1,2-epoxide, isocyanate, isocyanide, isothiocyanate, isothiourea, ketoxime, lactide, mercapto, oxime, ozonide, peroxide, thial, thiocyanate, and ureido, Z is a divalent organic radical bonded to the silicon* atom through a silicon*-carbon bond, R''' is a monovalent organic radical selected from the group consisting of hydrocarbon radicals and halogenohydrocarbon radicals and bonded to the silicon* atom through a silicon*-carbon bond, X is a hydrolyzable group other than halogen, G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquinoxanoxy radicals, bonded to the silicon* atom through a linkage selected from the group consisting of silicon*-silicon bonds, silicon*-oxygen-silicon bonds and silicon*-divalent hydrocarbon-silicon bonds, $g$ is an integer from 0 to 3 inclusive, $h$ is an integer from 0 to 3 inclusive, and the sum of $g$ and $h$ does not exceed 3, the functional organosilyl component is pendent on the prepolymer (I), and is bonded to the prepolymer through reaction of the functional group, Y, with an active site on the prepolymer selected from the group consisting of carboxyl, ester, anhydride, amide and amine.

The present invention consists essentially of a polyamide-polyimide modified by attaching pendent functional organosilyl components to the prepolymer. The prepolymer, defined as the polymer formed by the reaction of aromatic anhydrides or its derivatives with organic diamines, will have various reactive sites depending upon the proportions of the reagents. If the diamine is in excess, or if the equivalence ratio of diamine and aromatic anhydride or its derivatives is one, the reactive sites are acid groups, ester groups and the reactive hydrogen on the nitrogen of the amide linkages and on the amine groups. If the aromatic anhydride or its derivatives are in excess the reactive sites are acid, ester, anhydride and amide groups. In any case the final structure can only be suggested, not defined.

The polyamide-polyimide prepolymer is prepared by the reaction of an anhydride or an anhydride derivative with an amine. The anhydride is the preferred species in the present invention, but acids and esters are operative although with somewhat less efficiency. A requirement of this invention is that the anhydride and its derivatives be aromatic and that there be at least three carbonyl-containing groups per molecule. The carbonyl-containing groups are present only as acids, esters or anhydrides in this invention. The aromatic anhydrides or aromatic anhydride derivatives are of the general formula

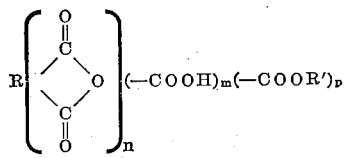

in which R is an aromatic radical of three, four, five or six valences, $n$ is an integer from 0 to 3, $m$ is an integer from 0 to 6, $p$ is an integer from 0 to 6, when $n$ is 0, the sum of $m+p$ is an integer from 3 to 6, when $n$ is 1, the sum of $m+p$ is an integer from 1 to 4, when $n$ is 2, the sum of $m+p$ is an integer from 0 to 2, when $n$ is 3, the sum of $m+p$ is 0, and R' is a monvalent hydrocarbon radical.

The monvalent hydrocarbon radical, R', is not a critical function of the present invention and may be any monovalent alkyl, aryl, cycloalkyl, halogenoalkyl, halogenoaryl and others as defined by R''' except that the radicals are not linked to silicon atoms but to oxygen atoms to form ester groups. The preferred monovalent hydrocarbon radicals are alkyl radicals, especially those containing from 1 to 10 carbon atoms. The aromatic carbonyl-containing compound must contain at least two carbonyl-containing groups in the ortho position. The anhydride groups each with a valence of two, and each containing two carbonyl-containing groups are always attached to adjacent carbon atoms. The aromatic carbonyl-containing compound can contain any combination of anhydride, acid or ester groups. The preferred number of carbonyl-containing groups per molecule is four, such as two anhydride groups, four acid groups, four ester groups or a combination of any four of these carbonyl-containing groups.

The aromatic radicals can be any of the following basic aromatic nuclei, each must contain at least two carbonyl-containing groups attached to adjacent carbon atoms whereas the other carbonyl-containing groups can be on any other ring position:

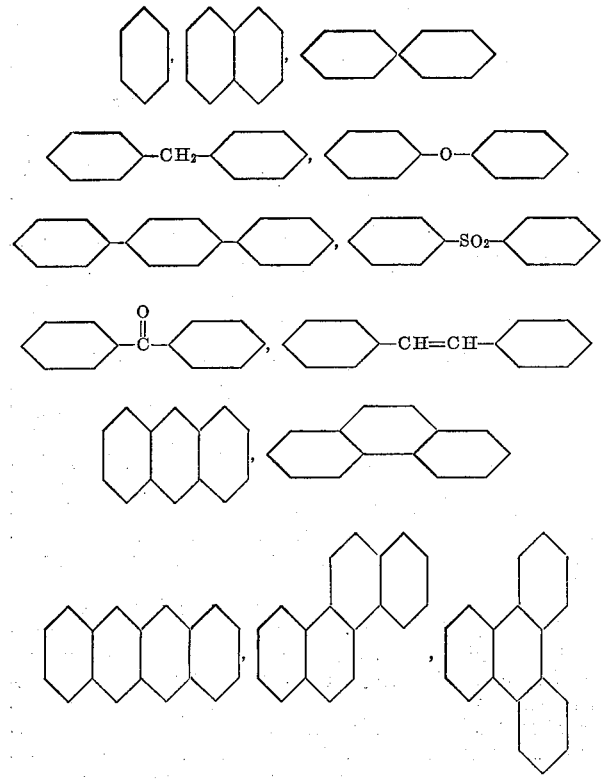

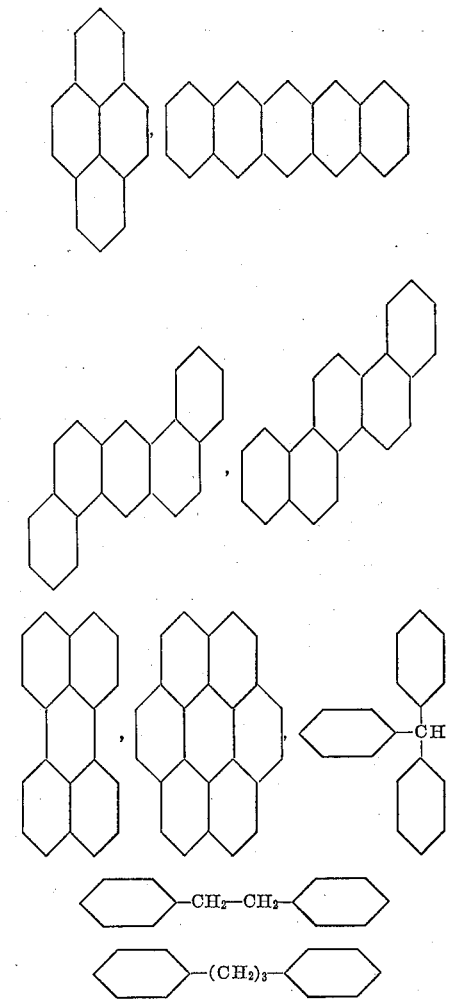

and

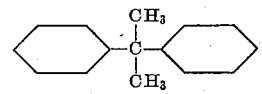

The preferred type of aromatic carbonyl-containing compound is the anhydride. The anhydride groups have better reactivity in the present invention than any of its derivatives. Specific examples illustrative of aromatic anhydrides operative in the present invention include: pyromellitic dianhydride; mellitic anhydride; trimellitic anhydride; 2,3,6,7-naphthalene tetracarboxylic dianhydride; 1,2,5,6-naphthalene tetracarboxylic dianhydride; 3,3',4,4'-diphenyltetracarboxylic dianhydride; 2,2',3,3'-diphenyltetracarboxylic dianhydride; 3,3',4,4'-diphenylmethane tetracarboxylic dianhydride; bis(3,4-dicarboxyphenyl)ether dianhydride; bis(3,4-dicarboxyphenyl)sulfone dianhydride; 3,3',4,4'-benzophenone tetracarboxylic dianhydride; 3,3',4,4'-stilbenetetracarboxylic dianhydride; 2,3,6,7-anthracenetetracarboxylic dianhydride; 1,2,7,8-phenanthrenetetracarboxylic dianhydride; 2,3,6,7-naphthacene tetracarboxylic dianhydride; 2,3,8,9-chrysene tetracarboxylic dianhydride; 2,3,6,7-triphenylene tetracarboxylic dianhydride; pyrene-4,5,9,10-tetracarboxylic dianhydride; perylene-3,4,9,10-tetracarboxylic dianhydride; and coronene-1,2,7,8-tetracarboxylic dianhydride. The above aromatic anhydrides are listed to better define the present invention and should not be construed as limiting the scope of the invention to these alone.

Specific examples of acids, esters and combinations of acids, esters and anhydrides for use in the present invention are as follows: 2,3-dicarboxylic monoanhydride benzoic acid; 2,3,5,6-tetracarboxylic dianhydride benzoic acid; benzene hexacarboxylic acid; 2,4-diethyl ester of benzene - 1,2,4,5 - tetracarboxylic acid; 3,3',4,4' - diphenyltetracarboxylic acid; 3,4-monoanhydride of 3,3',4,4'-diphenyl tetracarboxylic acid; 3,3'-dimethyl ester of diphenyl-3,3',4,4'-tetracarboxylic acid; 3,3',4,4'-tetraethyl ester of 3,3',4,4'-diphenyl tetracarboxylic acid; perylene-3,4,9,10-tetracarboxylic acid; and 3,4-monoanhydride of perylene-3,4,9,10-tetracarboxylic acid.

The amines operative in the present invention must be diamines. Both aromatic, aliphatic and mixed aromatic-aliphatic diamines are operative in the present invention, but the aromatic diamines are preferred over the aliphatic and mixed aromatic-aliphatic diamines. The aliphatic and mixed aromatic aliphatic diamines are less desirable as the thermal stability and hydrolytic stability are much less than the aromatic diamines. The diamines are of the general formula $H_2N-R''-NH_2$ where $R''$ is a divalent organic radical, preferably a divalent aromatic organic radical. Also operative are amines having the general formula $H_2N-R''-NHR'''$ wherein $R''$ and $R'''$ have previously been defined. Specific examples of $R''$ as an aliphatic divalent radical are: methylene, ethylene, proylene, butylene, amylene, hexylene, cyclohexylene, cyclopentylene, methylpropylene, 2,2-dimethylpropylene, methylhexylene, vinylene, $-CH_2CH_2-O-CH_2CH_2-$, 2-butenylene and 2-phenylpropylene.

Specific examples of $R''$ as an aromatic divalent organic radical are:

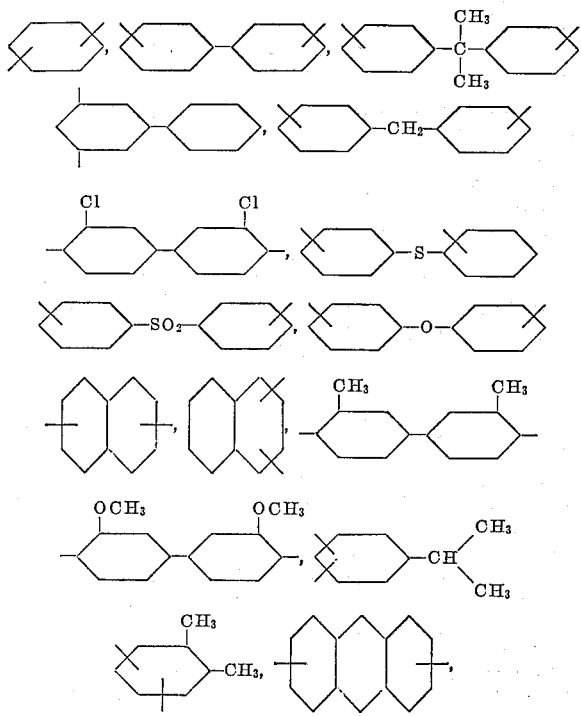

Specific examples of mixed aromatic-aliphatic, divalent radicals are:

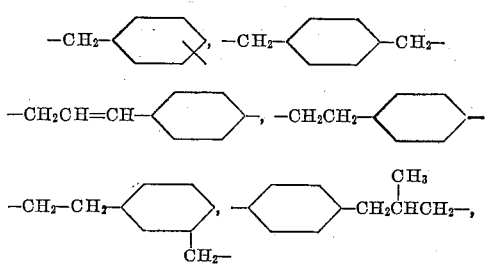

and

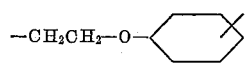

Specific examples of aliphatic organic diamines are: ethylenediamine; N-methylethylenediamine; trimethylenediamine; putrescine; cadaverine; hexamethylenediamine; 1,4-diaminocyclohexane; 1,3-diaminocyclopentane; 1,2-diaminoethane; 1,3-diamino-2-methylpropane; 1,6-diamino-4-methylhexane; 1,4-diamino-2-butene; 1-(N-propylamino)-6-aminohexane; and 1,3-diamino-2-phenylpropane.

Specific examples of aromatic-aliphatic diamines are: para-aminophenylmethylamine; meta-aminophenylmethylamine;

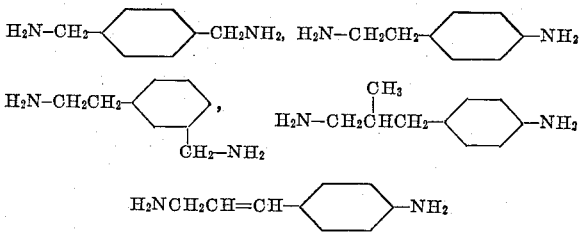

and

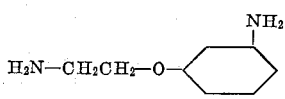

Specific examples of aromatic organic diamines are: 2,2 - di(4-aminophenyl)propane; 4,4' - diaminodiphenylmethane; benzidine; mono-N-methylbenzidine, 3,3'-dichlorobenzidine; 4,4' - diaminodiphenylsulfide; 3,3' - diaminodiphenyl sulfone; 4,4'-diaminodiphenyl sulfone; 4,4' - diaminodiphenyl ether; 1,5 - diaminonaphthalene; meta - phenylenediamine; 3,3'-dimethyl-4,4'-biphenyldiamine; 3,3'-dimethoxybenzidine-1-isopropyl - 2,4 - phenylenediamine; 3,5-diaminoorthoxylene; 3,5-diaminodiphenyl; 1,3-diaminonaphthalene; 2,6-diamino anthracine; and 4,4'-diaminostilbene. The most preferred aromatic diamines are 4,4'-diaminodiphenyl ether, 4,4'-diaminodiphenylmethane and para-phenylenediamine.

The aromatic carbonyl-containing compound and the organic diamine react to produce a prepolymer which is believed to be a polyamide, containing

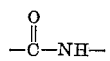

linkages. Imide linkages

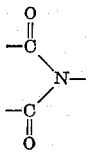

can also be present although it is believed that the amide linkage dominates the greatest percentage of the linkages between the monomer moieties of the prepolymer. For convenience of discussion the preferred types of monomer moieties, the aromatic dianhydrides and the aromatic diamines, will be used as illustrative of the reaction involved in the formation of the prepolymer.

The aromatic diamine and aromatic dianhydride can be reacted as such, the aromatic dianhydride can first be converted into a monomeric aromatic diester-diacid by reaction of the dianhydride with a monofunctional alcohol such as ethanol, or a combination of the two foregoing techniques can be used. The above procedures are the most preferred although acids can be used, but side reactions are more significant and in some cases reaction conditions need to be changed.

In the most preferred method the aromatic diamine and the aromatic dianhydride are mixed as dry solids and then added slowly to a suitable polar organic solvent with agitation, so as to control the temperature. The aromatic diamine can be dissolved in a suitable polar organic solvent and the dry aromatic dianhydride can be added slowly to this solution, or both can be slowly mixed after separately being dissolved in a polar organic solvent. It is not necessary to premix the dry solids, but it is preferred. The addition of the dry premixed monomers to the polar organic solvent is the preferred technique. However, the order of addition is not critical and the reaction proceeds with other orders of addition.

The aromatic carbonyl-containing compound can be present in the prepolymer in amounts from 45 to 55 mol percent. The preferred amount is 50 to 55 mol percent. The diamine can also be present in amounts from 45 to 55 mol percent with the preferred amount from 45 to 50 mol percent. Deviations of only up to 5 mol percent from the 50 mol percent for each of the ingredients, dianhydride and diamine, can be tolerated. The aromatic carbonyl-containing compound is preferred as the ingredient in excess over the diamine.

A polar organic solvent is preferred as the solvent for the reaction between the aromatic carbonyl-containing compound and diamine. The solvents useful in this polymerization step are those polar organic solvents whose functional groups do not react with either the diamine or the aromatic carbonyl-containing compound. The solvent should be a solvent for at least one of the reactants, preferably for both.

The preferred polar organic solvents useful in the present invention are: N,N-dimethylformamide; N,N-dimethylacetamide; N,N-diethylformamide; N,N-diethyl acetamide; N,N-dimethylmethoxyacetamide; dimethylsulfoxide; N-methyl-2-pyrrolidone; pyridine; dimethylsulfone; hexamethylphosphoramide; tetramethylene sulfone and dimethyltetramethylene sulfone. The critical feature of the solvent is that it be polar and non-reactive with any of the reactants. Combinations of the above solvents with less polar and less expensive solvents are particularly advantageous. Examples of such solvents are benzene, benzonitrile, dioxane, beta-ethoxyethylacetate, butyrolactone, xylene, toluene and cyclohexane. Water beyond trace amounts in the system cannot be tolerated. The entire process should be as anhydrous as possible to produce the best results. When combinations of polar and non-polar organic solvents are used, amounts of non-polar organic solvents can range up to 60 weight percent of the total solvent.

The temperature at which the reaction is carried out is important in the quality of the final polymer. In the preferred process, the temperature is maintained below 70° C. and preferably below 50° C. during the reaction between the aromatic carbonyl-containing compound and the diamine. The reaction is exothermic and external cooling can be used when necessary. The reaction is allowed to proceed until a clear viscous solution is obtained. At this point the prepolymer is in condition for the modification.

The following is beleived to be the structure of the prepolymer formed from the above reaction using pyromellitic dianhydride from 4,4'-diaminodiphenyl ether as an example of a repeating unit:

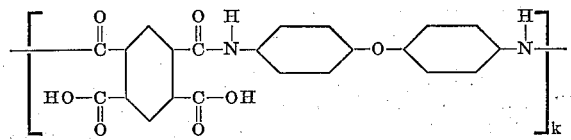

The average number of units, $k$, in the prepolymer must be at least 5 and has no practical upper limit. (Convenient operable average values of $k$ range up to 500,000 or more.) The prepolymers preferably have a high average molecular weight. The average molecular weight will be, practically speaking, determined by the amount of excess of either the aromatic carbonyl-containing compound or the diamine. Any of the anhydrides, acids, esters, and diamines can replace the above monomers in the symbolic expression. The symbolic expression is shown to give the dominant type of structure which is believed to exist in the prepolymer. The linkages can also be imide linkages, but the amount of such linkages present are such that interference in the modification step is not a problem.

The above prepolymer, a polyamide, is modified with a silicon moiety. The silicon moiety is derived from a silicon-containing material which for reasons of definitions can be called a "silane." The term "silane" as used in this disclosure is used to mean that the silicon-containing material has a silicon atom whereby the compound can properly be defined, thus a silane. A requirement of the silane is that it contain a functional group attached to the silicon* atom through a divalent organic radical. The silcon* indicates the silcon atom whereby the "silane" is defined. One group attached to the silicon* atom can have two functional groups per molecule or more.

A representative general formula for the silane is

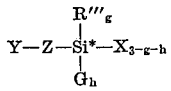

in which Y is a functional group free of silicon atoms containing at least one of the functional groups selected from the group consisting of carboxyl, hydroxyl, aldehyde, amide, primary amine, secondary amine, anhydride, carbamate, 1,2-epoxide, isocyanate, isocyanide, isothiocyanate, isothioureido, ketoxime, lactide, mercapto, oxime, ozonide, peroxide, thial, thiocyanate, and ureido, Z is a divalent organic radical, R''' is a monovalent organic radical selected from the group consisting of hydrocarbon radicals and halogenohydrocarbon radicals, G is a monovalent silicon-containing radical selected from the group consisting of siloxy radicals, silakylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds, $g$ is an integer from 0 to 3 inclusive, $h$ is an integer from 0 to 3 inclusive, the sum of $g+h$, does not exceed 3, X is a hydrolyzable group and the silane is free of silicon-halogen bonds.

The functional group, Y, is a reactive group, preferably reactive at below 70° C. This group can react with any of the reactive sites on the polyamide structure, particularly with the anhydride groups, the free carboxylic acid groups, the free ester groups and the unreacted hydrogen on the nitrogen atoms of the amine and amide groups. The functional group, Y, must be one of the functional groups listed above. The preferred functional groups are the amines, the 1,2-epoxide and the isocyanates. By the term "1,2-epoxide," it is to be understood that the group is

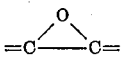

The linkages between the polyamide prepolymer and the silicon moiety will vary according to the type of the functional group Y. More than one functional group, under the definition of Y, can be present in the silicon moiety and if so, appears as part of the term Z. The silicon moiety is at all times pendent on the prepolymer, either at the ends of the prepolymer chain or along the chain. It is believed that the silane will react to produce linkages of various forms as shown by the following assumed structures. The silanes having amine or epoxide functional groups are used for illustrative purposes.

(1)
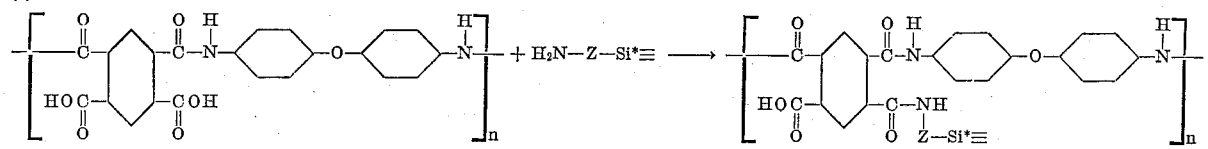

(2)
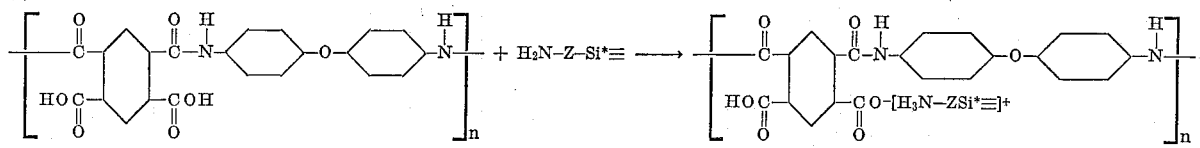

(3)
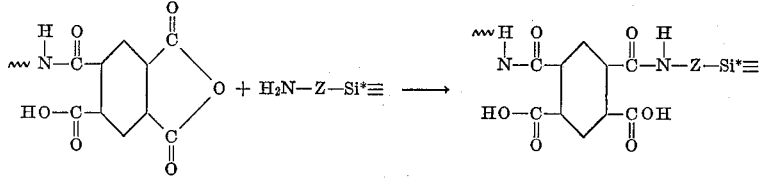

(4)
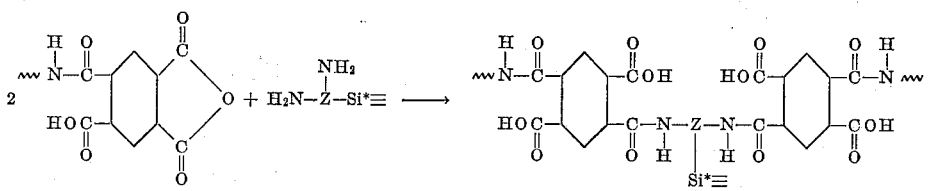

(5)
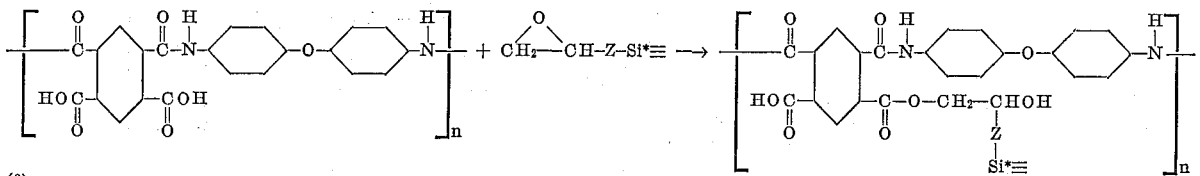

(6)
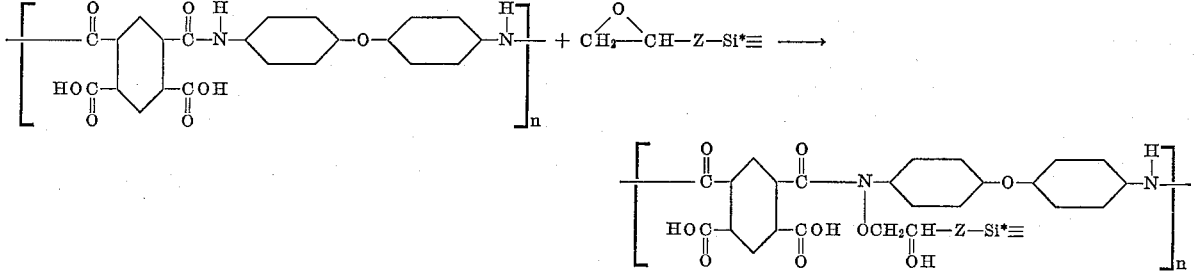

Each functional group, Y, on the silane will produce linkage characteristic of the group and it will react with the reactive sites accordingly.

The divalent organic radical, Z, can be any divalent organic radical which can be composed of carbon and any one or more of hydrogen, nitrogen, oxygen, sulfur, phosphorus, fluorine, chlorine, bromine and iodine. The only requirements of Z is that it be divalent and that it have a silicon*-carbon linkage. Specific examples of divalent organic radicals operative in the present invention are:

—CH$_2$—, —CH$_2$CH$_2$—, —CH=CH—, —CH$_2$(CH$_2$)$_4$CH$_2$—
—CH$_2$CH(CH$_3$)CH$_2$—, —CH$_2$CH$_2$NHCH$_2$—

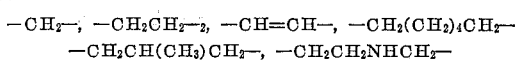

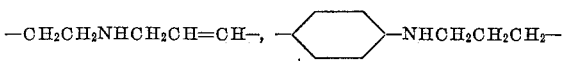

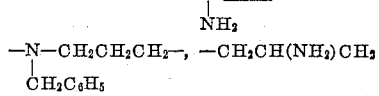

—CH$_2$CH$_2$NHCH$_2$CH$_2$CH$_2$—, —CH$_3$—O—CH$_2$CH$_2$CH$_2$—
—CH$_2$CH$_2$NHCHCH$_2$CH$_2$—, —CH$_2$CH$_2$CH$_2$CH$_2$
　　　　　　|
　　　　　CH$_2$
　　　　　|
　　　NH—CH$_2$CH$_2$NH$_2$

OH
　　|
—CH$_2$CH(CH$_2$)$_2$CH$_2$—, —CH$_2$(CH$_2$)$_{16}$CH$_2$—, —CH$_2$CH$_2$SCH$_2$CH$_2$—
—CF$_2$CF$_2$—, —CH$_2$CHClCH$_2$CH$_2$—, —CH$_2$CH(CH$_2$Br)CH$_2$—
—C$_6$H$_4$—, —CH$_2$C$_6$H$_4$—, —CH$_2$CH$_2$(CN)CH$_2$— and

—CH$_2$CH$_2$PCH$_2$CH$_2$—
　　　|
　　　CH$_3$

The number of organic functional groups, Y—Z—, attached to silicon* is one.

The monovalent radicals, R''', can be a hydrocarbon or a halogenohydrocarbon. Specific examples are: methyl, ethyl, propyl, butyl, octadecyl, vinyl, allyl, phenyl, xenyl, tolyl, xylyl naphthyl cyclohexyl, 3,3,3-trifluoropropyl, monochlorophenyl and dibromophenyl. The number of monovalent radicals, R''' per silicon* is 0, 1, 2 or 3.

The silicon-containing group G, attached to the silicon* atom can be attached through a silicon*-silicon bond, silicon*-oxygen-silicon bond or a silicon*-divalent hydrocarbon-silicon bond. The silicon-containing group can be composed of any of the following units or any combination of the following units:

$$SiO_2, R^{IV}SiO_{1.5}, R_2^{IV}SiO, R_3^{IV}SiO_{0.5}, R_3^{IV}Si, {}_{1.5}OSi-Q-SiO$$

$$_{1.5}OSi-Q-\overset{R_2^{IV}}{Si}O_{0.5}, \; _{1.5}OSi-Q-SiR_3^{IV}, \; O\overset{R^{IV}}{Si}-Q-\overset{R_2^{IV}}{Si}O_{0.5}$$

$$O\overset{R^{IV}}{Si}-Q-SiR_3^{IV} \text{ and } _{0.5}OSi-Q-\overset{R_2^{IV}}{Si}R_3^{IV}$$

Each $R^{IV}$ is a monovalent radical selected from the group defined by R'''. Each Q is a divalent hydrocarbon radical selected from the group consisting of $-CH_2-, -CH_2CH_2-, -CH_2CH_2CH_2-,$

[cyclohexyl, bicyclohexyl, decahydronaphthyl ring structures],

[cyclohexyl-O-cyclohexyl, cyclohexyl-CH_2-cyclohexyl], and

[cyclohexyl-C(CH_3)_2-cyclohexyl]

All the bonds of the silicon-containing groups are satisfied by other silicon-containing units and by hydroxyls and other hydrolyzable groups other than halogen atoms. The most preferred composition of G should not contain large amounts of $SiO_2$, as the silane is preferably soluble and low molecular weight and does not contain any silicon-halogen bonds. There can be 0, 1, 2 or 3 silicon-containing groups, G, attached to the silicon* atom. The preferred silicon-containing groups, G, contain from 1 to 10 silicon atoms.

The hydrolyzable group, X, can be any hydrolyzable group except halogen. Halogens react with the system and inhibit the formation of the final polymer. The silanes can contain 0, 1, 2 or 3 hydrolyzable groups. Specific examples of hydrolyzable groups are: methoxy, ethoxy, phenoxy, isopropoxy, butoxy, alkoxies in general, hydrogen, acetate, propionate, butyrate, benzoate, naphthanate hydroxyl, and $$-O-N=C\begin{matrix} R' \\ R' \end{matrix}$$

The most preferred nonhalogeno-hydrolyzable group, X, is alkoxy.

Specific examples of $$Y-Z-\underset{G_h}{\overset{R'''_g}{Si^*}}-X_{3-g-h}$$

are as follows:

$$H_2N-CH_2CH_2\overset{NH_2}{\underset{}{CH}}(CH_2)_3Si^*(OCH_3)_3$$

$$H_2NCH_2CH_2NHCH_2\overset{CH_3}{\underset{CH_3}{CH}}CH_2\overset{C_6H_5}{\underset{}{Si^*}}OCH_3$$

$HSCH_2CH_2CH_2Si^*(OCH_2CH_3), \; O=C=N-CH_2CH_2CH_2Si^*(CH_3)_3$ $$H_2N-\text{[phenyl]}-\overset{H}{N}-(CH_2)_3\overset{CH=CH_2}{\underset{O}{Si^*}}-O\text{—}\left[\overset{C_6H_5}{\underset{CH_3}{Si}}-O\right]_4\overset{C_6H_5}{\underset{CH_3}{Si}}-CH=CH_2$$

$[(C_6H_5)_2SiO]_3H$ $$H_2NCH_2CH_2NHCH_2\overset{CH_3}{\underset{}{CH}}CH_2\overset{CH_3}{\underset{}{Si^*}}(OCH_3)_2$$

$$H_2N-\text{[phenyl-}NH_2\text{]}-CH_2-\overset{(CH_3)_2}{Si^*}(OCH_3)$$

$H_2NCH_2CH_2NH(CH_2)_3Si^*(OCH_3)_3$ $$\overset{O}{\underset{CH_2-CH}{CH-CH_2}}-\text{[cyclohexyl]}-Si^*(OCH_3)_3$$

$$H_2N-CH_2\overset{Cl}{\underset{}{CH}}CH_2CH_2-\overset{C_2H_5}{\underset{C_2H_5}{Si^*}}-\left(O-N=C\begin{matrix}C_2H_4\\C_2H_5\end{matrix}\right)_2$$

$$\overset{O}{\underset{CH_2-CHCH_2}{\triangle}}-S-(CH_2)_3\overset{(CH_2CH_2CF_3)_2}{\underset{}{Si^*}}-OC_2H_5$$

$$OCN-\text{[phenyl-}NCO\text{]}-CH_2-Si^*(OCH_3)_3$$

$$H_2NCH_2\overset{NH_2}{\underset{}{CH}}CH_2-\overset{CH_3}{\underset{}{Si^*}}-O-\overset{O}{\underset{}{C}}-CH_3$$

$$\text{[phenyl]}-\overset{O}{\underset{O}{Si}}-(O-\overset{O}{\underset{}{C}}-CH_3)_2$$

$$\left[\overset{}{\underset{(CH_3)_2}{Si}}-O\right]_5 H$$

$$\overset{O}{\underset{CH_2-CHCH_2}{\triangle}}O-(CH_2)_3Si^*(OCH_3)_3$$

$$HOOC-CH_2CH_2CH_2\overset{CH_3}{\underset{CH_3}{Si^*}}-O\left[\overset{CH_3}{\underset{CH_3}{Si}}-O\right]_{10} H$$

$$HO-CH_2CH_2\overset{CH_3}{\underset{}{CH}}CH\overset{C_6H_5}{\underset{CH_3}{Si^*}}-H, \; H\overset{O}{\underset{}{C}}-\text{[phenyl]}-CH_2Si^*(CH_3)_3$$

$$H_2N-\overset{O}{\underset{}{C}}-CH_2CH_2CH_2Si^*(OCH_3)_3, \; \text{[bicyclic anhydride]}-Si^*(OC_2H_5)_3$$

$$HOOC-\overset{CH_2}{\underset{CH}{CH}}\overset{C}{\underset{CH_2}{\underset{}{}}}\overset{}{\underset{}{CH}}-Si^*(OC_2H_5)_3$$

$$H_2N\overset{O}{\underset{}{C}}-O-CH_2CH_2CH_2\overset{C_6H_5}{\underset{}{Si^*}}(CH_3)_2$$

$$\overset{\leftarrow}{C}=N-CH_2CH_2\overset{C_6H_5}{\underset{}{CH}}CH_2-\overset{CH_3}{\underset{CH_3}{Si^*}}-O\left[\overset{CH_3}{\underset{CH_3}{Si}}-O\right]_{21} H$$

$$H_2N-\overset{NH}{\underset{}{C}}-S-CH_2CH_2CH_2Si^*(CH_3)_3$$

$$HON=\overset{CH_3}{\underset{}{C}}-CH_2CH_2CH_2-\overset{CH_3}{\underset{C_6H_5}{Si^*}}-OH$$

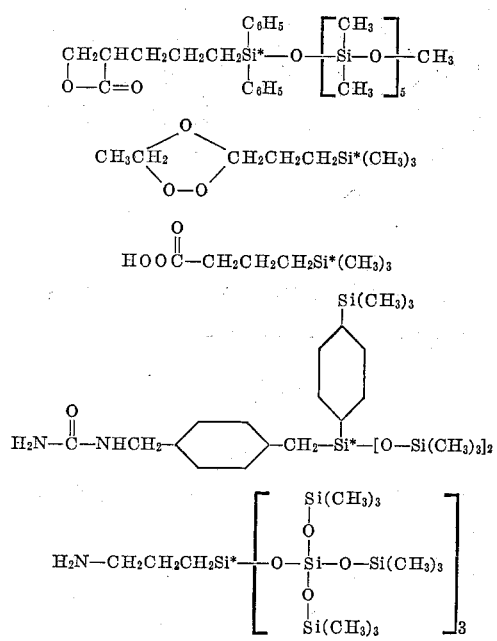

and a hydrolyzate having the units

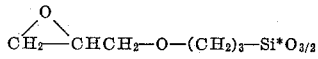

and $(C_6H_5)CH_3SiO$.

The silanes can be purchased from commercial concerns or can be prepared by well known techniques and procedures. Examples for the preparation of amine organo functional silanes can be found in the following United States Patents, Nos. 2,832,754, 2,930,809, 2,955,898, 2,971,864, and 3,018,299, and British Patent 914,460. The preparation of other functional silanes can be found in the art such as amides in United States Patents Nos. 2,557,802, 2,610,198, 2,647,137, and 2,974,062; carboxyls in United States Patents Nos. 2,589,445, 2,647,137, 2,687,418, 2,687,424 and 2,974,062; hydroxyl in United States Patents Nos. 2,687,424 and 2,963,501; isothiocyanates in United States Patent No. 2,762,826; aldehydes in United States Patents Nos. 2,588,083 and 2,641,605; ozonides in United States Patent; No. 2,805,236; anhydrides in United States Patents Nos. 2,687,418 and 2,974,062; thiocyanates in United States Patent No. 2,719,165; peroxides in United States Patent No. 2,963,501, and epoxides in United States application Serial No. 174,238, filed February 19, 1962.

The prepolymer is modified with from 1 to 55 weight percent of silane. The most preferred range is from 5 to 40 weight percent.

The silane is added to the polyamide solution after it has become clear and viscous. The addition is slow with agitation. After the silane is completely added, the temperature is raised above 40° C., preferably above 50° C. for 5 minutes to 10 hours to induce some of the amide linkages to convert to imide linkages. At least 50% conversion is desired, greater than 50% conversion to the imide is preferred, but not complete conversion as complete conversion is accomplished during the curing operation. Thus, the final polymer is believed to contain amide linkages

and imide linkages

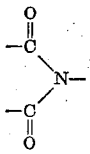

bonding the aromatic carbonyl-containing monomers to the diamines forming the main chain of the polymer. The silicon moieties are believed to be bonded to the polyamide-polyimide chains at points where there are free carboxylic acid groups, anhydride groups or hydrogen on the nitrogen atoms, the amide linkages and the amine groups. The exact linkage of the silicon moieties to the polyamide-polyimide is unknown, but the silicon moiety is believed to be pendent.

The polymer is cured by heating. The temperatures can range from room temperature to 250° C. depending upon the rate of cure desired. The most preferred curing range is from 100° to 180° C. Further curing to improve the thermal stability can be accomplished by heating to 300° to 500° C. for short time intervals. A curing catalyst, other than heat, can also be used for curing. An example of such a catalyst is a mixture of pyridine and acetic anhydride with all ratios workable. Another catalyst can be dicyclohexylcarbodiimide.

The silicon modified polyamide-polyimide polymers are preferred to be prepared from the polyamide prepolymers which have been prepared from aromatic carbonyl-containing compounds and aromatic diamines. These modified polyamide-polyimide polymers are superior thermally to the modified polyamide-polyimide polymers prepared from prepolymers having the aliphatic diamine moieties. Although the polyamide-polyimide polymers containing the aliphatic diamines moieties do not have all the superior properties of those containing the aromatic diamine moieties, useful products can be formed from the aliphatic diamine containing polyamide-polyimide polymers which are film forming, which have greater solubility, which wet metals as well as those containing the aromatic diamines, which use more of less expensive solvents and which can be used where high thermal stability is not necessarily required.

The same techniques and methods can be used for preparing silicon modified polyamide-polyimide polymers containing all aliphatic diamine moieties or combination of aliphatic and aromatic diamine moieties.

In a specific embodiment of this disclosure, the pendent silicon moiety contains a functional organic group which serves two purposes during the formation of the silicon modified polyamide-polyimide polymer. The advantage of this embodiment is that where ordinarily two steps are employed to produce the final silicon modified polyamide-polyimide, one forming a prepolymer and two modifying with a silane, now only one step is required to produce the final polymer. The nature of the silane is the key to this novel procedure and to the silicon modified polyamide-polyimide.

The specific embodiment relates to a new composition of matter consisting essentially of a reaction product prepared by reacting (III) 45 to 55 inclusive mol percent of at least one aromatic compound selected from the group consisting of aromatic acids, aromatic esters and aromatic anhydrides having at least three carbonyl-containing groups per molecule selected from the group consisting of carboxyl groups, —COOH; ester groups, —COOR; in which R' is a monovalent hydrocarbon radical; and anhydride groups

bonded only to another

through the $O_{1/2}$, and at least two of the carbonyl containing groups are in the ortho positions, with (IV) from 45 to 55 inclusive mol percent of a diamine of the general formula selected from the group consisting of

and

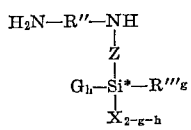

in which $R^V$ is a trivalent organic radical of which one valence position is bonded to the silicon* atom through silicon*-carbon bonds, R", R''', X, G, Z, g and h have been fully described above, and said diamines are free of silicon-halogen bonds.

The aromatic carbonyl-containing compound which has been fully described previously is reacted with the diamines containing silicon by the same procedure as that used in preparing the prepolymer previously described, except that in this special case the silicon modification is complete when the prepolymer is formed and raising the temperature above 50° C. converts the amide linkages to imide linkages.

The aromatic carbonyl containing compound, such as an aromatic dianhydride is either mixed with the diamine and added to a polar organic solvent, dissolved in a polar organic solvent and the diamine is then added, or added to a polar organic solvent solution of the diamine. The reaction conditions and solvents are the same as previously described. The solution temperature is raised above 50° C. as previously stated to cause the amide linkages to convert to imide linkages.

The diamines of the general formula

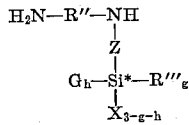

in which R" is a divalent organic radical and Z is a divalent organic radical bonded to the silicon* atom through silicon*-carbon bonds and G, R''', X, g and h have been fully described above are operative.

The divalent organic radical, R", can be either an aliphatic, an aromatic or a mixed aromatic aliphatic radical. Specific examples of the divalent organic radicals, R" can be found above under the discussion of R'''. Also the discussion of Z can be found fully described above.

Specific examples of the diamines of the general formula

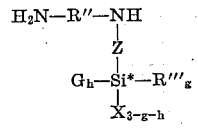

are:

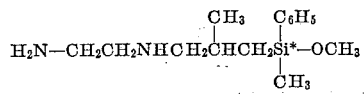

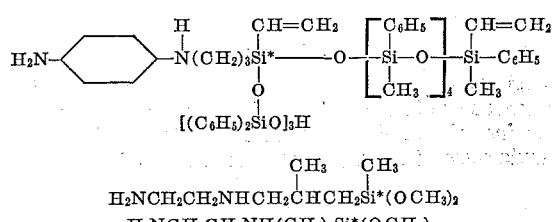

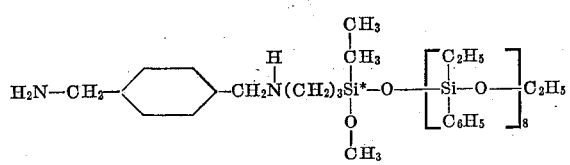

and

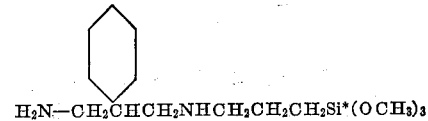

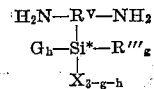

The diamines of the general formula

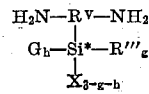

in which $R^V$ is a trivalent organic radical of which one valence position is bonded to the silicon* atom through silicon*-carbon bonds and G, R''', X, g and h have been fully described above are operative. The trivalent organic raidcal, $R^V$, can be aliphatic, aromatic or mixed aliphatic-aromatic radicals. Specific examples of aliphatic trivalent radicals are:

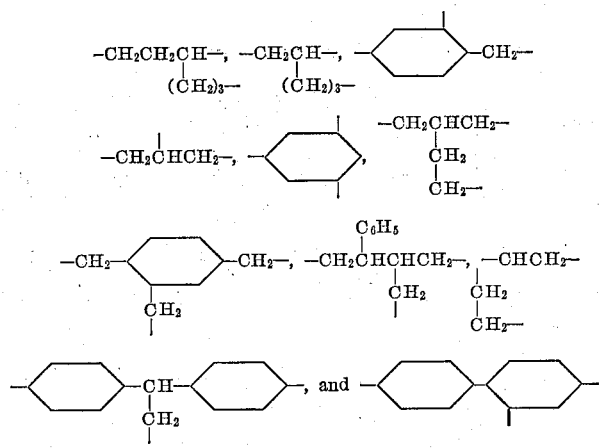

Specific examples of diamines of the general formula

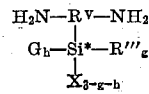

are:

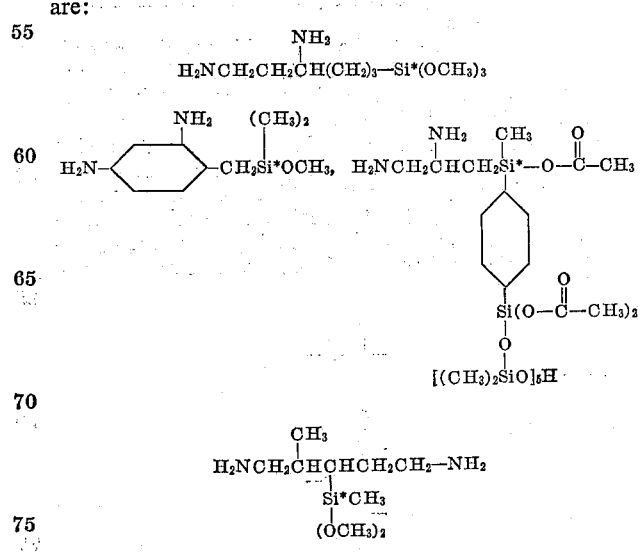

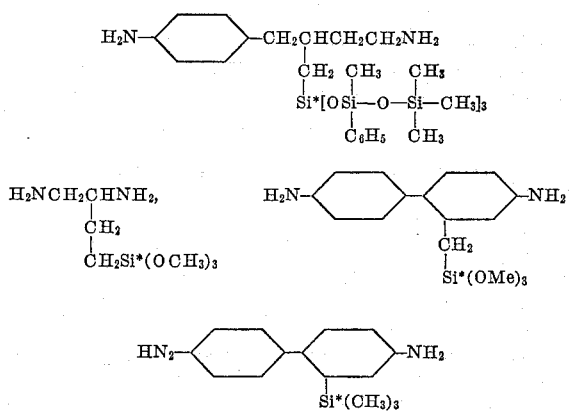

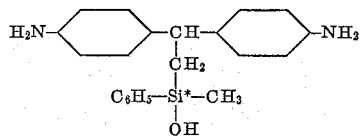

and

The final silicon modified polyamide-polyimide polymers are believed to be of the following structures of repeating units, using pyromellitic dianhydride as the aromatic carbonyl-containing compound for illustrative purposes.

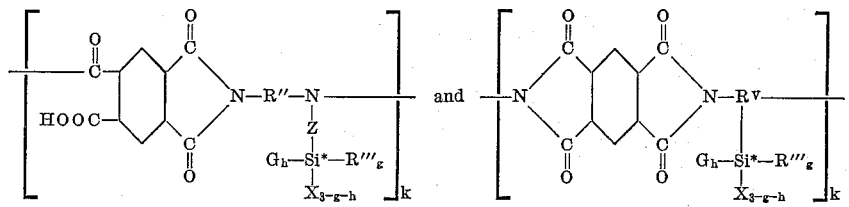

are the units where $k$ has been described above and any one polymer can be composed of either of the two units above or combinations of the two units.

The above specific embodiment enables one to produce the silicon-modified polyamide-polyimide polymer or the silicon modified polyimide with a single step. The advantages of such a product are obvious. The introduction of new linkages into the final polymer are no longer necessary. The silicon moiety of the pendent and is a part of the diamine moiety of the polyimide or polyamide polyimide. The amount of silicon present is evenly distributed along the polymer chain and aids in increasing the solubilities, adhesions and electrical properties.

In order that the amount of the pendent silicon moiety can be varied a portion of the silicon containing diamine can be replaced with an organic diamine, preferably an aromatic organic diamine.

The present invention also relates to a new composition of matter consisting essentially of a reaction product prepared by reacting (V) 45 to 55 inclusive mol percent of at least one aromatic compound selected from the group consisting of aromatic acids, aromatic esters and aromatic anhydrides, having at least three carbonyl-containing groups per molecule selected from the group consisting of carboxyl groups, —COOH; ester groups, —COOR′ in which R′ is a monovalent hydrocarbon radical; and anhydride groups

bonded only to another

through the $O_{1/2}$, and at least two of the carbonyl containing groups are in ortho positions, with (IV) from 45 to 55 inclusive mol percent of least two diamines of which at least one is selected from the group consisting of aliphatic organic diamines, aromatic organic diamines and mixed aliphatic-aromatic organic diamines and at least one diamine is selected from the group consisting of the general formulae

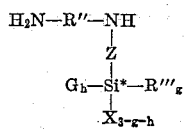

and

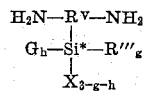

in which R″, Z, G, R‴, X, $R^V$, $g$ and $h$ have been fully described above.

The procedure for producing the polyamide-polyimide polymers are the same as previously described herein and the final products fall within the definitions presented.

The amount of each type of diamine is not critical as all combinations will be operative. The only critical feature is that at least one of each of the two types of diamines be present to form the silicon-modified polyamide-polyimide polymer.

The silicon-modified polyamide-polyimide polymers are thermally stable and solvent resistant. The silicon modified polyamide-polyimide polymers are excellent film formers, and are tough and flexible. The polymers are much superior when aromatic moieties of the diamines are used. These silicon modified polyamide-polyimide poylmers have improved wettability on metals making application easier, will bind to glass thus forming excellent glass laminates besides other laminates, are useful as wire coatings, are useful as other protective coatings and electrical coatings and are useful for impregating paper and paper products.

The outstanding properties of the silicon-modified polyamide-polyimide polymers over polyimide polymers are the much improved wetting on metal surfaces; one coat will form thicker films as higher solids are obtained because of the increased solubility; less expensive solvents can be used having up to 60 weight percent of the solvent system as non-polar solvents, such as toluene making it more commercially appealing while retaining the properties of the polyimides.

The following examples are illustrative only and should not be construed as limiting the invention which is properly delineated in the appended claims.

EXAMPLE 1

A prepolymer is prepared by thoroughly mixing the dry powders of 71.8 g. of 4,4′-diaminodiphenyl ether and 78.2 g. of pyromellitic dianhydride. The dry mixture is added slowly over a period of one hour and twenty-three minutes to 400 g. of N,N-dimethylformamide. An exothermic reaction occurs and the temperature reaches a maximum of 51° C. at the end of the addition. The solution is agitated for 30 minutes and cooled. To 30 g. of the above solution 1 g. of a fluid cohydrolyzate composed of the units

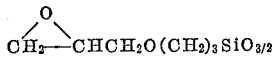

and $(C_6H_5)CH_3SiO$ in a molar ratio of 1:2 respectively, is added dropwise at the rate of not more than two drops per second. The solution is agitated and is at room temperature. The solution is 25.9% solids and has a viscosity of 256 centipoise at 25° C. The product is clear and compatible.

EXAMPLE 2

When 4 moles of 2,3,6,7-naphthalene tetracarboxylic dianhydride is dissolved in 600 g. of N,N'-dimethylacetamide and 2 mols of benzidine is slowly added over a period of 50 minutes, a prepolymer is formed. To the prepolymer, 2 mols of

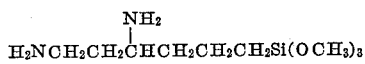

is slowly added over a period of 30 minutes. The temperature reaches a maximum of about 45° C. when the last of the benzidine is added. The solution temperature is then raised to 60° C. for 30 minutes for imide conversion. The product is a flexible, tough and film forming when cured at 130° C. with dicyclohexylcarbodiimide for 30 minutes and then at 200° C. for 5 minutes.

EXAMPLE 3

When 1,5-diamino naphthalene is used instead of benzidine in accordance with Example 2, except that the 1,5-diamino naphthalene is dissolved in N,N-dimethyl acetamide instead of dissolving the anhydride in the solvent, similar results are obtained.

EXAMPLE 4

71.8 g. of 4,4′-diaminodiphenyl ether are mixed with 82.1 g. of pyromellitic dianhydride and added to a mixture of 231 g. of xylene and 539 g. of N,N-dimethylformamide over a period of 13 minutes. An exothermic reaction occurs and the temperature reaches a maximum of 51° C. at the end of the addition to the solvent. The conversion of a portion of the amide linkages to imide linkages is accomplished by heating between 65 and 67° C. for 6 hours. The resulting clear solution is 22% solids and has a viscosity of 304 centipoise at 25° C.

The above prepolymer forms coating polymers with excellent wetting properties when modified with 20 weight percent of any of the following silicon-containing compounds:

(a)
$$H_2NCH_2CH_2NHCH_2\overset{\overset{\displaystyle CH_3}{|}}{C}HCH_2\overset{\overset{\displaystyle C_6H_5}{|}}{Si}OCH_3$$
$$\underset{\displaystyle CH_3}{|}$$

(b) $HSCH_2CH_2Si(OCH_2CH_3)_3$ (c)
$$\overset{\overset{\displaystyle COOH}{|}}{C}H_2CH_2CH_2\overset{\overset{\displaystyle (CH_3)}{|}}{Si}(OCH_3)_2$$

(d) $O=C=N-CH_2CH_2CH_2Si(CH_3)_3$ (e)

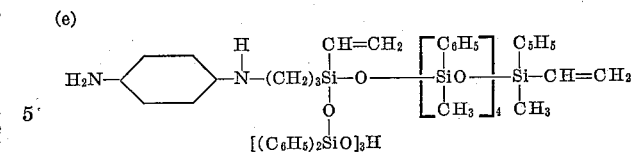

EXAMPLE 5

A dry mixture of 71.8 g. of 4,4′-diaminodiphenyl ether and 82.1 g. of pyromellitic dianhydride is slowly added to mixture of 215 g. of N,N-dimethylformamide and 143 g. of xylene over a period of 28 minutes, reaching a temperature of 44° C. at the end of the addition. The conversion of some of the amide linkages to imide linkages was accomplished by heating to 65° C. for 8.5 hours. Similar results are obtained when reacted with the silicon-containing compounds of Example 4.

EXAMPLE 6

Using the procedure in accordance with Example 4, changing the solvent to a mixture of 309 g. each of beta-ethoxyethyl acetate and N,N-dimethylformamide, the addition time to 41 minutes, the maximum temperature to 38° C., and the partial conversion of amide to imide of 6 hours at 60 to 70° C., an excellent film forming product is obtained.

EXAMPLE 7

A dry mixture of 54.5 g. of pyromellitic dianhydride and 9.5 g. of 4,4′-diaminodiphenyl ether is slowly added to a mixture of 64.8 g. of N,N-dimethylformamide and 97.0 g. of N-methyl-2-pyrrolidone. The addition requires 20 minutes and the temperature goes up to 32° C. To the clear solution 44.15 g. of

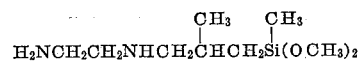

is added. The solution is hazy at start of addition but begins clearing within the 12 minutes as the temperature rises to 40° C. After an additional 10 minutes the silane is completely added and the solution is clear and viscous. The final solution is 39.4% solids with a viscosity of 539 centipoises at 25° C.

EXAMPLE 8

When 5 mols of 3,3′,4,4′-diphenyltetracarboxylic dianhydride is dissolved in dimethylsulfone and 5 mols of

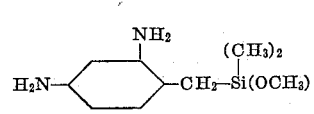

is slowly added, a clear, tough, thermally stable product is obtained.

EXAMPLE 9

A dry mixture of 1.26 mols of pyromellitic dianhydride and 1.20 mols of 4,4′-diaminodiphenyl ether is slowly added to 1716 g. of N,N-dimethylformamide, maintaining the temperature at 40° C. or less. The prepolymer is modified by adding 1.0% of

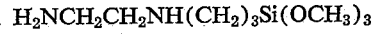

based on the total weight. The temperature is then raised to 80° C. for 20 minutes to convert the amide linkage to imide linkages. The product is clear, flexible and film forming.

EXAMPLE 10

When the following monomers are reacted in accordance with Example 7 similar results are obtained:

| A<br>Aromatic carbonyl-containing compound | Mols of A | B<br>Aromatic diamine | Mols of B | C<br>Silane | Mols of C |
|---|---|---|---|---|---|
| Hexahydrophthalic anhydride (HOOC-cyclohexyl-anhydride structure) | 2 | H₂N-⌬-CH₂-⌬-NH₂ | 1.7 | $CH_2$—$CH$-⌬-Si(OCH₃)₃ with epoxy CH—CH₂ group | 0.9 |
| H₃COOC-⌬-⌬-COOCH₃, HOOC-⌬-⌬-COOH | 3 | H₂N-⌬-S-⌬-NH₂ | 3 | H₂N—CH₂CHClCH₂CH₂Si, (O—N=C(C₂H₅)₂)₂ | 0.4 |
| Pyrene tetracarboxylic acid (HOOC-, HOOC-, -COOH, -COOH) | 2 | H₂N-⌬-C(CH₃)₂-⌬-NH₂ | 2 | $CH_2$—CHCH₂-S-(CH₂)₃Si(OC₂H₅)(CH₂CH₂CF₃)₂ | 0.3 |
| Cyclohexane tetracarboxylic dianhydride, and pentacarboxylic trianhydride structures | 3<br>0.5 | H₂N-⌬-O-⌬-NH₂ | 3 | OCN-⌬(NCO)-CH₂Si(OCH₃)₃ | 3 |
| Bicyclic dianhydride (decahydronaphthalene tetracarboxylic dianhydride) | 6 | H₂N-⌬-NH₂ | 1 | H₂NCH₂CHCH₂Si—(O—C(=O)—CH₃) with NH₂, CH₃ substituents; Si—(O—C(=O)—CH₃)₂; [Si—O—(CH₃)₂]₅—H | 5 |

That which is claimed is:

1. A composition of matter consisting essentially of an organo silicon-modified polyamide-polyimide prepared by reacting
   (I) 45 to 99 inclusive weight percent, based on the total weight of (I) and (II), of an organic solvent soluble polyamide-polyimide prepolymer formed by reacting
      (A) from 45 to 55 inclusive mol percent of at least one carbocyclic aromatic compound, containing atoms selected from the group consisting of carbon, hydrogen, oxygen and sulfur, and selected from the group consisting of aromatic acids, aromatic esters and aromatic anhydrides, having at least three carbonyl-containing groups per molecule selected from the group consisting of carboxyl groups, —COOH; ester groups, —COOR' in which R' is a monovalent hydrocarbon radical; and anhydride groups,

bonded only to another

and at least two of the carbonyl-containing groups are in ortho positions, with
   (B) from 45 to 55 inclusive mol percent of diamines selected from the group consisting of organic aliphatic diamines, organic aromatic diamines and mixed aliphatic-aromatic diamines, each diamine containing at least one primary amine group, with (II) from 1 to 55 inclusive weight percent, based on the total weight of (I) and (II), of a functional organosilyl component free of silicon-halogen bonds of the general formula

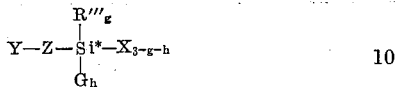

in which
Si* is a silicon atom which is a reference point used to define the functional organosilyl component,
Y is a functional group free of silicon atoms selected from the group consisting of carboxyl, hydroxyl, aldehyde, amide, primary amine, secondary amine, anhydride, carbamate, 1,2-epoxide, isocyanate, isocyanide, isothiocyanate, isothiourea, ketoxime, lactide, mercapto, oxime, ozonide, peroxide, thial, thiocyanate and ureido,
Z is a divalent organic radical bonded to the silicon* atom through a silicon*-carbon bond,
R''' is a monovalent organic radical selected from the group consisting of hydrocarbon radicals and halogenohydrocarbon radicals, bonded to the silicon* atom through a silicon*-carbon bond,
X is a hydrolyzable group,
G is a monovalent silicon-containing radical selected from the group consisting of siloxy radicals, silalkylene radicals, silarylene radicals, siloxanoxy radials, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
$g$ is an integer from 0 to 3 inclusive,
$h$ is an integer from 0 to 3 inclusive, the sum of $g$ and $h$ does not exceed 3.

2. A composition of matter consisting essentially of an organo silicon-modified polyamide-polyimide prepared by reacting
(I) 45 to 99 inclusive weight percent, based on the total weight of (I) and (II), of an organic solvent soluble polyamide-polyimide prepolymer formed by reacting
(A) from 45 to 55 inclusive mol percent of at least one carbocyclic aromatic anhydride, having at least three carbonyl-containing groups per molecule selected from the group consisting of carboxyl groups, —COOH; ester groups, —COOR', in which R' is a monovalent hydrocarbon radical; and anhydride groups,

bonded only to another

and at least two of the carbonyl-containing groups are anhydride groups and are in ortho positions, with
(B) from 45 to 55 inclusive mol percent of diamines selected from the group consisting of organic aliphatic diamines, organic aromatic diamines and mixed aliphatic-aromatic diamines, each diamine containing at least one primary amine group, with
(II) from 1 to 55 inclusive weight percent, based on the total weight of (I) and (II), of a functional organosilyl component free of silicon-halogen bonds of the general formula

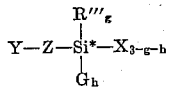

in which
Si* is a silicon atom which is a reference point used to define the functional organosilyl component,
Y is a functional group free of silicon atoms selected from the group consisting of carboxyl, hydroxyl, aldehyde, amide, primary amine, secondary amine, anhydride, carbamate, 1,2-epoxide, isocyanate, isocyanide, isothiocyanate, isothiourea, ketoxime, lactide, mercapto, oxime, ozonide, peroxide, thial, thiocyanate and ureido,
Z is a divalent organic radical bonded to the silicon* atom through a silicon*-carbon bond,
R''' is a monovalent organic radical selected from the group consisting of hydrocarbon radicals and halogenohydrocarbon radicals, bonded to the silicon* atom through a silicon*-carbon bond,
X is a hydrolyzable group,
G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
$g$ is an integer from 0 to 3 inclusive,
$h$ is an integer from 0 to 3 inclusive, the sum of $g$ and $h$ does not exceed 3.

3. A composition of matter in accordance with claim 2 wherein the diamine of (B) is an aromatic diamine, X is an alkoxy radical, Y is a primary amine and $h$ is 0.

4. A composition of matter consisting essentially of an organo silicon-modified polyamide-polyimide prepared by reacting
(I) 45 to 99 inclusive weight percent, based on the total weight of (I) and (II), of an organic solvent soluble polyamide-polyimide prepolymer formed by reacting
(A) from 45 to 55 inclusive mol percent of pyromellitic dianhydride with
(B) from 45 to 55 inclusive mol percent of 4,4'-diaminodiphenyl ether with
(II) from 1 to 55 inclusive weight percent, based on the total weight of (I) and (II), of

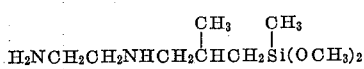

5. A composition of matter consisting essentially of an organo silicon modified polyamide-polyimide prepared by reacting
(I) 45 to 99 inclusive weight percent, based on the total weight of (I) and (II), of an organic solvent soluble polyamide-polyimide prepolymer formed by reacting
(A) from 45 to 55 inclusive mol percent of pyromellitic dianhydride with
(B) from 45 to 55 inclusive mol percent of 4,4'-diaminodiphenyl ether, with
(II) from 1 to 55 inclusive weight percent, based on the total weight of (I) and (II), of

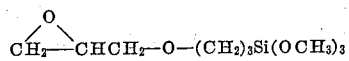

6. A composition of matter consisting essentially of an organo silicon-modified polyamide-polyimide prepared by reacting (III) 45 to 55 inclusive mol percent of at least one carbocyclic aromatic compound, containing atoms selected from the group consisting of carbon, hydrogen, oxygen and sulfur, and selected from the group consisting of aromatic acids, aromatic esters and aromatic anhydrides having at least three carbonyl-containing groups per molecule selected from the group consisting of carboxyl groups, —COOH; ester groups, —COOR' in which R' is a monovalent hydrocarbon radical; and anhydride groups,

bonded only to another

and at least two of the carbonyl containing groups are in the ortho positions, with (IV) from 45 to 55 inclusive mol percent of a diamine of the general formula selected from the group consisting of

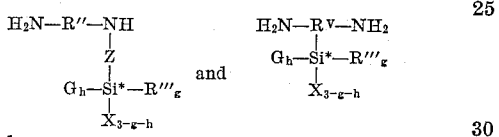

in which
Si* is a silicon atom which is a reference point used to define the diamine,
R" is a divalent organic radical,
Z is a divalent organic radical bonded to the silicon* atom through silicon*-carbon bonds,
$R^V$ is a trivalent organic radical of which one valence position is bonded to the silicon* atom through silicon*-carbon bonds,
R''' is a monovalent organic radical selected from the group consisting of hydrocarbon radicals and halogenohydrocarbon radicals and bonded to the silicon* atom through silicon*-carbon bonds,
X is a hydrolyzable group,
G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
g is an integer from 0 to 3 inclusive,
h is an integer from 0 to 3 inclusive, the sum of g and h does not exceed 3, and said diamines are free of silicon-halogen bonds.

7. A composition of matter consisting essentially of an organo silicon-modified polyamide-polyimide prepared by reacting (III) 45 to 55 inclusive mol percent of at least one carbocyclic aromatic anhydride having at least three carbonyl containing groups per molecule selected from the group consisting of carboxyl groups, —COOH; ester groups, —COOR' in which R' is a monovalent hydrocarbon radical; and anhydride groups,

bonded only to another

and containing at least two anhydride groups and in ortho positions, with (IV) from 45 to 55 inclusive mol percent of a diamine of the general formula selected from the group consisting of

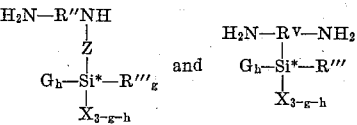

in which
Si* is a silicon atom which is a reference point used to define the diamine,
R" is a divalent organic radical,
Z is a divalent organic radical bonded to the silicon* atom through silicon*-carbon bonds,
$R^V$ is a trivalent organic radical of which one valence position is bonded to the silicon* atom through silicon*-carbon bonds,
R''' is a monovalent organic radical selected from the group consisting of hydrocarbon radicals and halogenohydrocarbon radicals and bonded to the silicon* atom through silicon*-carbon bonds,
X is a hydrolyzable group,
G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
g is an integer from 0 to 3 inclusive,
h is an integer from 0 to 3 inclusive, the sum of g and h does not exceed 3, and said diamines are free of silicon halogen bonds.

8. A composition of matter in accordance with claim 7 wherein the diamine of (IV) is

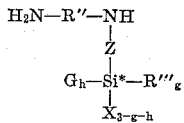

9. A composition of matter in accordance with claim 7 wherein the diamine of (IV) is

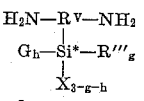

10. A composition of matter consisting essentially of an organo silicon-modified polyamide-polyimide prepared by reacting (III) 45 to 55 inclusive mol percent of pyromellitic dianhydride with (IV) from 45 to 55 inclusive mol percent of

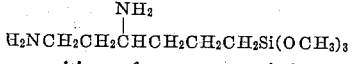

11. A composition of matter consisting essentially of an organo silicon-modified polyamide-polyimide prepared by reacting (V) 45 to 55 inclusive mol percent of at least one carbocyclic aromatic compound, containing atoms selected from the group consisting of carbon, hydrogen, oxygen and sulfur, and selected from the group consisting of aromatic acids, aromatic esters and aromatic anhydrides, having at least three carbonyl-containing groups per molecule selected from the group consisting of carboxyl groups, —COOH; ester groups,—COOR' in which R' is a monovalent hydrocarbon radical; and anhydride groups,

bonded only to another

and at least two of the carbonyl-containing groups are in ortho positions, with
(VI) from 45 to 55 inclusive mol percent of at least two diamines of which at least one is selected from the group consisting of aliphatic organic diamines, aromatic organic diamines and mixed aliphatic-aromatic organic diamines and at least one diamine is selected from the group consisting of the general formulae

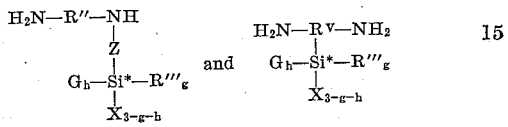

in which Si* is a silicon atom which is a reference point used to define the diamines of the general formulae

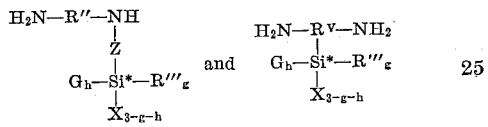

R″ is a divalent organic radical,
Z is a divalent organic radical bonded to the silicon* atom through silicon*-carbon bonds,
R$^v$ is a trivalent organic radical of which one valence position is bonded to the silicon* atom through silicon*-carbon bonds,
R‴ is a monovalent organic radical selected from the group consisting of hydrocarbon radicals and halogenohydrocarbon radicals and bonded to the silicon* atom through silicon*-carbon bonds,
X is a hydrolyzable group,
G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
$g$ is an integer from 0 to 3 inclusive,
$h$ is an integer from 0 to 3 inclusive, the sum of $g$ and $h$ does not exceed 3, and said diamines are free of silicon halogen bonds.

12. A composition of matter consisting essentially of an organo silicon-modified polyamide-polyimide prepared by reacting
(V) 45 to 55 inclusive mol percent of at least one carbocylic aromatic anhydride having at least three carbonyl-containing groups per molecule selected from the group consisting of carboxyl groups, —COOH; ester groups, —COOR′ in which R′ is a monovalent hydrocarbon radical; and anhydride groups,

bonded only to another

and containing at least two anhydride groups and in ortho positions, with
(VI) from 45 to 55 inclusive mol percent of at least two diamines of which at least one is selected from the group consisting of aliphatic organic diamines, aromatic organic diamines and mixed aliphatic-aromatic organic diamines and at least one diamine is selected from the group consisting of the general formulae

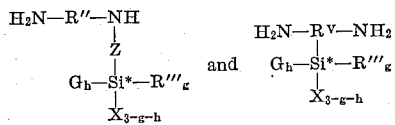

in which Si* is a silicon atom which is a reference point used to define the diamines of the general formulae

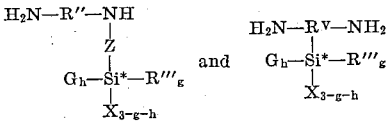

R″ is a divalent organic radical,
Z is a divalent organic radical bonded to the silicon* atom through silicon*-carbon bonds,
R$^v$ is a trivalent organic radical of which one valence position is bonded to the silicon* atom through silicon*-carbon bonds,
R‴ is a monovalent organic radical selected from the group consisting of hydrocarbon radicals and halogenohydrocarbon radicals and bonded to the silicon* atom through silicon*-carbon bonds,
X is a hydrolyzable group,
G is a monovalent silicon-containing radical selected from the group consisting of siloxy radicals, silalkylene radicals, silarylene radicals, siloxanoxy radicals, siloxanalkylene radicals, siloxanarylene radicals, cyclosiloxanoxy radicals, and silsesquioxanoxy radicals, bonded to the silicon* atom through a linkage selected from the group consisting of silicon*-silicon bonds, silicon*-oxygen-silicon bonds and silicon*-divalent hydrocarbon-silicon bonds,
$g$ is an integer from 0 to 3 inclusive,
$h$ is an integer from 0 to 3 inclusive, the sum of $g$ and $h$ does not exceed 3, and said diamines are free of silicon-halogen bonds.

13. A composition of matter in accordance with claim 12 wherein one diamine of (VI) is an aromatic organic diamine and one diamine of (VI) is a diamine of the general formula

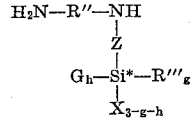

X is alkoxy and $h$ is 0.

14. A composition of matter in accordance with claim 12 wherein one diamine of (VI) is an aromatic organic diamine and one diamine of (VI) is a diamine of the general formula

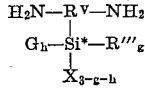

X is alkoxy and $h$ is 0.

References Cited by the Examiner

UNITED STATES PATENTS 3,179,630 4/1965 Endrey _____ 260—78
3,179,632 4/1965 Hendrix _____ 260—78

WILLIAM H. SHORT, *Primary Examiner.*

H. D. ANDERSON, *Assistant Examiner.*